US009410403B2

(12) United States Patent
Wochner et al.

(10) Patent No.: US 9,410,403 B2
(45) Date of Patent: Aug. 9, 2016

(54) UNDERWATER NOISE REDUCTION SYSTEM USING OPEN-ENDED RESONATOR ASSEMBLY AND DEPLOYMENT APPARATUS

(71) Applicant: AdBm Technologies LLC., Austin, TX (US)

(72) Inventors: Mark S. Wochner, Austin, TX (US); Lawrence R. Gravell, Austin, TX (US); Steven De Leon, Austin, TX (US); Richard A. Patterson, Georgetown, TX (US)

(73) Assignee: AdBm Corp., Austin, TX (US)

( * ) Notice: Subject to any disclaimer, the term of this patent is extended or adjusted under 35 U.S.C. 154(b) by 0 days.

(21) Appl. No.: 14/572,248

(22) Filed: Dec. 16, 2014

(65) Prior Publication Data

US 2015/0170631 A1 Jun. 18, 2015

Related U.S. Application Data

(60) Provisional application No. 61/917,343, filed on Dec. 17, 2013.

(51) Int. Cl.

| | |
|---|---|
| ***G01V 1/387*** | (2006.01) |
| ***E02D 13/00*** | (2006.01) |
| ***E21B 41/00*** | (2006.01) |
| ***G10K 11/172*** | (2006.01) |
| *G01V 1/38* | (2006.01) |

(52) U.S. Cl.
CPC .......... *E21B 41/0007* (2013.01); *G10K 11/172* (2013.01); *G10K 2200/11* (2013.01)

(58) Field of Classification Search
CPC ....... E02D 13/00; E02D 13/005; E02D 13/02; E02D 13/04; E02B 17/003; E02B 17/0017; E21B 41/0007; G01V 1/38; G01V 1/387
USPC .................................. 181/115, 250; 405/211
See application file for complete search history.

(56) References Cited

U.S. PATENT DOCUMENTS 2,528,049 A 10/1950 Gonda
2,610,695 A * 9/1952 Grue .................... E04B 1/8209 181/295
3,022,632 A 2/1962 Parks (Continued)

FOREIGN PATENT DOCUMENTS

EP 2657410 A2 10/2013
WO WO2013102459 A2 7/2013

OTHER PUBLICATIONS

U. Ingard, "On the Theory and Design of Acoustic Resonators", The Journal of the Acoustical Society of America, Nov. 1953, p. 1037-1061, vol. 25, No. 6.

(Continued)

*Primary Examiner* — Edgardo San Martin
(74) *Attorney, Agent, or Firm* — Intrinsic Law Corp.; Ibrahim M. Hallaj

(57) ABSTRACT

A novel underwater noise abatement and deployment system are described. The system uses inverted open-ended resonators (e.g., Helmholtz resonators) to absorb underwater noise. The system includes stackable resonator cavity embodiments arranged to surround a noisy environment or act nearby it. The system can be deployed from a ship or barge or similar structure, and can be stored when not in use.

6 Claims, 9 Drawing Sheets

(56) References Cited

U.S. PATENT DOCUMENTS

| | | | | | |
|---|---|---|---|---|---|
| 3,886,491 | A | | 5/1975 | Jonkey et al. | |
| 3,975,918 | A | * | 8/1976 | Jansz | E02D 13/00 173/DIG. 2 |
| 4,241,806 | A | | 12/1980 | Metzger | |
| 4,300,855 | A | * | 11/1981 | Watson | E02B 15/02 405/211 |
| 4,505,617 | A | * | 3/1985 | Miller | B63B 39/00 405/211 |
| 4,548,292 | A | | 10/1985 | Noxon | |
| 5,082,084 | A | * | 1/1992 | Ye-Ming | H04R 1/021 181/153 |
| 5,394,786 | A | | 3/1995 | Gettle et al. | |
| 5,457,291 | A | | 10/1995 | Richardson | |
| 5,658,656 | A | | 8/1997 | Whitney et al. | |
| 5,959,938 | A | | 9/1999 | Behrens | |
| 6,125,965 | A | | 10/2000 | Wang | |
| 6,550,574 | B2 | | 4/2003 | Liu | |
| 6,567,341 | B2 | | 5/2003 | Dreyer et al. | |
| 6,571,906 | B2 | | 6/2003 | Jones et al. | |
| 6,698,390 | B1 | * | 3/2004 | Kostun | F02M 35/1222 123/184.57 |
| 6,743,367 | B2 | | 6/2004 | Dreyer | |
| 6,918,740 | B2 | | 7/2005 | Liu | |
| 6,977,109 | B1 | | 12/2005 | Wood | |
| 7,108,457 | B1 | * | 9/2006 | Brown | E21B 17/01 114/144 B |
| 7,126,875 | B2 | | 10/2006 | Baskerville et al. | |
| 7,861,804 | B2 | * | 1/2011 | Haglund | B25D 17/11 175/325.1 |
| 7,896,126 | B1 | | 3/2011 | Haberman et al. | |
| 7,905,323 | B2 | | 3/2011 | Larsen | |
| 8,276,889 | B2 | | 10/2012 | Norris et al. | |
| 8,387,746 | B2 | | 3/2013 | Parkin | |
| 8,500,369 | B2 | | 8/2013 | Mohr | |
| 8,636,101 | B2 | | 1/2014 | Elmer | |
| 8,689,935 | B2 | | 4/2014 | Wilson et al. | |
| 8,794,375 | B2 | * | 8/2014 | Jung | E02D 7/14 181/205 |
| 2003/0006090 | A1 | | 1/2003 | Reed | |
| 2004/0146396 | A1 | | 7/2004 | Liu | |
| 2005/0083783 | A1 | | 4/2005 | Baskerville et al. | |
| 2005/0167193 | A1 | | 8/2005 | Van Reeth | |
| 2007/0140518 | A1 | | 6/2007 | Larsen | |
| 2007/0187174 | A1 | * | 8/2007 | Mayor | F01N 1/02 181/250 |
| 2009/0145688 | A1 | | 6/2009 | Marcoux | |
| 2011/0031062 | A1 | | 2/2011 | Elmer | |
| 2011/0186380 | A1 | | 8/2011 | Beauvilain et al. | |
| 2012/0097476 | A1 | | 4/2012 | Jung et al. | |
| 2012/0107054 | A1 | * | 5/2012 | Baumfalk | E02B 17/0004 405/227 |
| 2012/0241039 | A1 | | 9/2012 | Jung et al. | |
| 2013/0001010 | A1 | | 1/2013 | Wilson et al. | |
| 2013/0056270 | A1 | | 3/2013 | Ward | |
| 2013/0111812 | A1 | * | 5/2013 | Fisher | A01G 9/023 47/66.7 |
| 2014/0208647 | A1 | * | 7/2014 | Carpenter | A01G 9/023 47/66.7 |
| 2015/0078833 | A1 | * | 3/2015 | Elmer | E02D 13/00 405/195.1 |
| 2015/0191987 | A1 | * | 7/2015 | Wochner | E21B 33/10 181/210 |

OTHER PUBLICATIONS

K. M. Lee et al., "Sound propagation in water containing large tethered spherical encapsulated gas bubbles with resonance frequencies in the 50 Hz to 100 Hz range", J. Acoust. Soc. Am., Nov. 2011, p. 3325-3332, vol. 130, issue 5, pt. 2, Acoustical Society of America.

K. M. Lee et al., "Mititgation of low-frequency underwater sound using large encapsulated bubbles and freely-rising bubble clouds", Proceedings of Meetings on Acoustics, May 2011, vol. 12, Acoustical Society of America through the American Institute of Physics.

K. Lee et al., "Attenuation of low-frequency underwater sound using bubble resonance phenomena and acoustic impedance mismatching", Proceedings of Meetings on Acoustics, Nov. 2010, vol. 11, Acoustical Society of America through the American Institute of Physics.

US International Searching Authority, "International Search Report" May 22, 2015, WIPO.

* cited by examiner

UNDERWATER NOISE REDUCTION SYSTEM USING OPEN-ENDED RESONATOR ASSEMBLY AND DEPLOYMENT APPARATUS

RELATED APPLICATIONS

The present application derives from and claims priority to U.S. Provisional Application No. 61/917,343, filed on Dec. 17, 2013, bearing the present title.

TECHNICAL FIELD

The present disclosure relates to reduction of noise in noisy underwater environments including sea-faring vessels, oil rigs and other industrial and military applications.

BACKGROUND

Some human activities cause underwater noise that is transmitted from the source of the underwater noise to the surrounding environment, sometimes many miles away. The underwater noise generated by oil and gas drilling platforms, ships and other human activities and machinery is generally considered undesirable. Some studies conclude that underwater noise pollution can adversely affect marine life, and it may be disruptive to other human activities such as scientific, meteorological and military activities. This is especially true for noise generating activities that result in large amplitude acoustic emissions (loud sounds) and transmissions at frequencies to which human and oceanic life is sensitive.

Ships that operate in environmentally sensitive or highly regulated regions can be limited in the manner or time in which they can operate due to the noise generated by the ship. This occurs in the oil and gas field, where noise from mobile drilling ships limits drilling time due to the effect that the noise can have on migrating bowhead whales in Arctic regions. When bowhead whales are sighted, operations may be halted until they have safely passed, and this process can take many hours.

As mentioned above, there is some concern over the effect that shipping and other man-made noise has on marine mammals. Some studies suggest that man-made noise can have a significant impact on the whale's stress hormone levels, which might affect their reproduction rates, etc.

Known attempts to reduce noise emissions from surface ships include the use of a so-called Prairie Masker, which uses bands of hoses that produce small freely-rising bubbles to mitigate ship's noise. However, small freely-rising bubbles are usually too small to effectively attenuate low-frequency noise. In addition, Prairie Masker systems require continuous pumping of air through the system, a process itself that produces unwanted noise, and also consuming energy and requiring a complex gas circulation system that is costly and cumbersome to the other operations of the ship. Finally, such systems cannot operate below a given depth due to hydraulic forces and back pressures.

One principle that is useful in approximating or understanding the acoustic effects of gas pockets in liquid (e.g., air pockets or bubbles or enclosures in water) is the behavior of spherical gas bubbles in liquid. The physics of gas bubbles is relatively well known and has been studied theoretically, experimentally and numerically.

FIG. 1 illustrates a model of a gas (e.g., air) bubble 10 in a liquid 15 (e.g., water). One model for studying the response of gas bubbles is to model the bubble of radius "a" as a mass on a spring system. The mass is "m" and the spring is modeled as having a spring constant "k". The radius of the bubble 10 will vary with pressures felt at its walls, causing the bubble 10 to change size as the gas therein is compressed and expands. In some scenarios the bubble 10 can oscillate or resonate at some resonance frequency, analogous to how the mass on spring system can resonate at a natural frequency determined by said mass, spring constant and bubble size.

Continuing efforts to mitigate the effects of underwater noise continue. While some solutions can actually reduce the amount of noise generated by a source other solutions seek to reduce the effect of the noise by surrounding or partially surrounding the noise-making source with something that absorbs or otherwise attenuates the propagated noise.

SUMMARY

The present disclosure is directed to reduction of the severity of noise emissions from the vicinity of a noise generating object or activity. The present concepts can be applied to man-made noise but also more generally to any noise generated from a source under water (e.g., in the seas, coastal areas, drilling fields, lake beds, and so on).

Gas trapped in the pockets under or around an object in the water can act as free bubbles and/or Helmholtz-like resonators and thus work to abate noise in much the same way as a resonant bubble. To give an example of how this would work in on a ship, a panel with hemispherical, cylindrical, conical (or similar shape) cavities could be attached to its hull, and while submerged the pockets could be filled with gas via an external mechanism or an internal manifold system. The properties of these pockets would be chosen so that the gas trapped within each pocket resonates at or near the frequencies that we wish to attenuate (e.g., between about 30 Hz to about 200 Hz including about 110 Hz), thus maximizing their efficacy. For the example of pile driving, sheets or panels containing a plurality of these resonators can be deployed to fully surround the whetted portion of the pile. As in the previous example, the properties of the pockets would be chosen to maximize the efficacy of the system.

The system is customizable and can attenuate noise to the amount desired (e.g., 10 dB or more). The system can also be produced to specifically target frequencies that are particularly loud. In other aspects, the present invention provides added thermoacoustic absorption of sound by selective application of a permeable mesh over an open end of the resonator.

In an aspect, the system includes a resonator with articulated sidewalls that reduce a length of the resonator in a storage configuration. In another aspect, the system includes resonators that are stackable in a storage configuration to reduce space during transportation, storage, and stowage on board a pile-driving vessel, for example. In yet another aspect, the system includes a first resonator in fluid communication with a second resonator through a conduit. The first resonator can receive a gas through an inlet where the gas can fill the interior volume of the first resonator and the second resonator through the conduit.

This system may allow the operator to work for longer periods of time and in areas previously unavailable due to noise regulations. This system is also much more effective at reducing noise than current technology because each gas cavity is built so that the gas trapped inside will maximally reduce the targeted underwater noise. In addition it does not require power or expensive support equipment.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

Gas trapped in the pockets under or around an object in the water can act as free bubbles and/or like Helmholtz (or similar) resonators (e.g., Minnaert resonators and/or Church resonators) and thus work to abate noise in much the same way as a resonant bubble.

Figure 1:
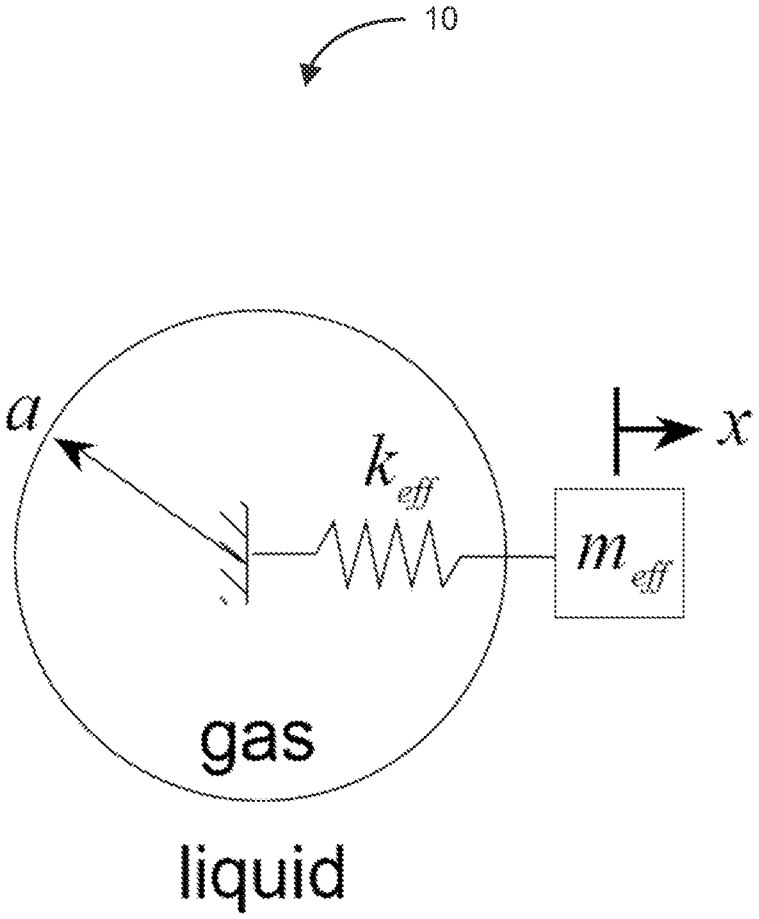
Fig. 1 (PRIOR ART)
FIG. 1 illustrates a model of a gas bubble in a liquid according to the prior art.

The height of the interior volume of the cavity and its volume are configurable to suit the purpose at hand. The hydrostatic pressure around the resonators varies with depth below the surface, the cavities' size and/or shape can vary according to their location with respect to the water line on the face of the panel. Thus, the cavities may be designed to accommodate the change in water pressure felt at the neck of the cavities due to the depth to which they are submerged, as (in the analogy of FIG. 1) their spring constants can change according to the density and depth of water around them.

In some embodiments, a mesh or other solid screen such as a metal screen (e.g., copper screen) can be placed over the face of the panels. This can act to stabilize the air in the cavities. This can also act as a heat sink to dissipate thermal energy absorbed by the resonating volume of the cavity and potentially improve its performance.

In some embodiments a hemispherical or spherical section or spheroidal section cavity is suitable for damping noise in a useful frequency range.

Figure 2A:
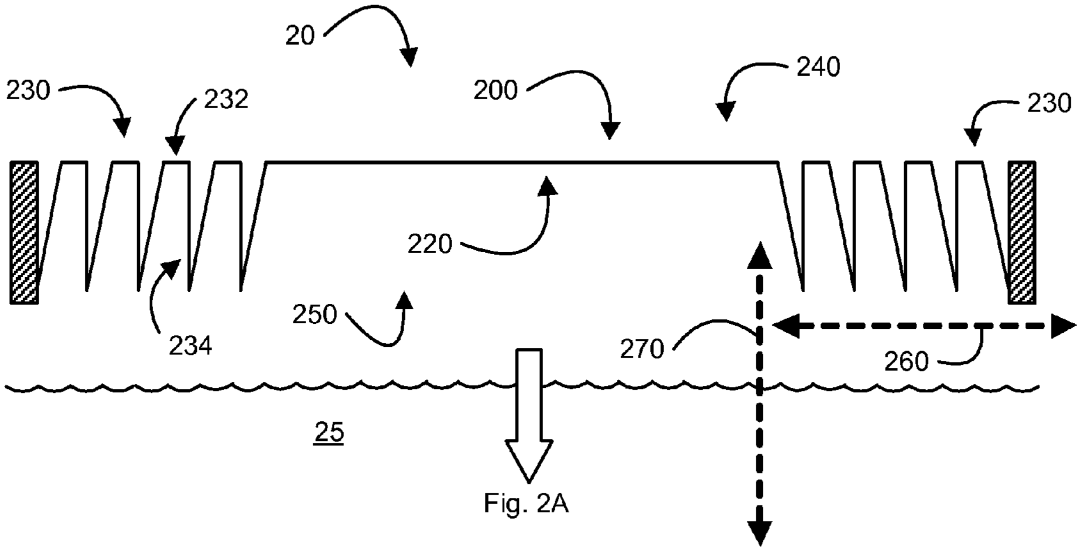
FIGS. 2A and 2B illustrate cross sections of a collapsible resonator according to an embodiment.
Figure 2B:
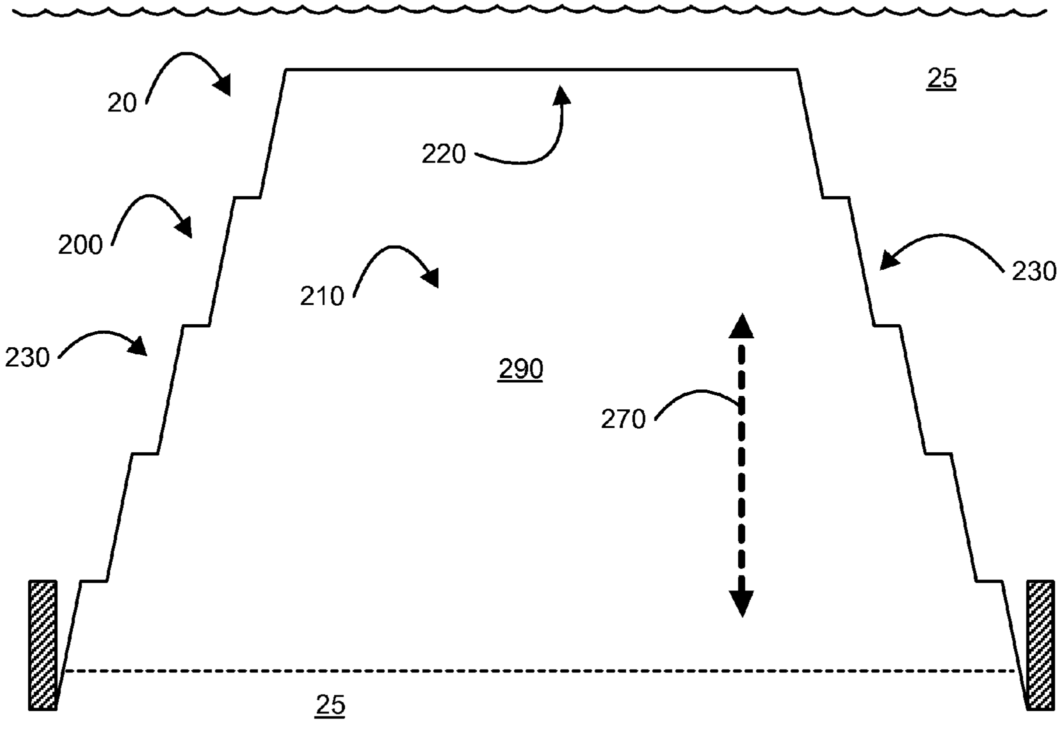

FIGS. 2A and 2B illustrate cross sections of an embodiment of a collapsible resonator 20. The resonator 20 in FIG. 2A is shown in collapsed form as it would be stored and transported when not deployed in water 25. The resonator 20 has a hollow body 200 including an optional circumferential portion 220 connected to segmented sidewalls 230. The hollow body 200 has a closed end 240 and an open end 250. The closed end 240 generally corresponds to the segmented sidewalls 230 and optional circumferential portion 220.

As illustrated, the segmented sidewalls 230 are folded (e.g., similar to an accordion) in a first direction 260 to reduce a length of the segmented sidewalls 230 in a second direction 270. The second direction 270 is orthogonal to the first direction 260. It is noted, however, that other relative orientations of the first direction 260 and second direction 270 fall within the scope of the invention and are a matter of design choice. The segmented sidewalls 230 include a first sidewall 232 and a second sidewall 234. The first sidewall 232 is shorter than the second sidewall 234 to reduce the length of the segmented sidewalls 230 along the first direction 260. The first direction 260 can be parallel to the first sidewall 232 when the resonator 20 is in the collapsed or storage configuration. The first sidewall 232 can have an equal or greater length than the second sidewall 234 in some embodiments. The segmented sidewalls 230 can be formed of a rigid material or can have a rigid frame (e.g., aluminum) with a flexible material (e.g., neoprene) on the walls defined by the frame. Alternatively, the segmented sidewalls 230 can be a flexible material.

The resonator 20 in FIG. 2B is shown in expanded form as it would be when deployed in water 25. As the resonator 20 is submerged in water 25, the resonator 20 traps air or a buoyant fluid in an interior 290 of the hollow body 200. In addition or in the alternative, a gas can be introduced into the hollow body 200 from a gas source (not shown), such as a gas tank. The buoyancy of the air (or buoyant fluid) in the interior 290 of the hollow body 200 creates a force on the segmented sidewalls 230 causing them to unfold in the second direction 270 thus increasing the length of the segmented sidewalls 230 in the second direction 270. As the segmented sidewalls 230 increase in length in the second direction 270, like a parachute, a volume of the hollow body 200 increases as well. The volume is filled with the air but at a reduced pressure due to the increased volume of the hollow body 200. Alternatively, the volume is filled with a fluid having a higher buoyancy than the water 25.

As illustrated, the resonator 20 in FIG. 2B looks like an inverted cup with an interface 295 between the water 25 and the air (or buoyant fluid) in the cup. The interface 295 is near the open end 250 of the hollow body 200. The resonator 20 can act like a Helmholtz resonator (or other resonator such as a Minnaert resonator and/or a Church resonator) and can have a resonance frequency as discussed above. The interior 290 of the resonator 20 can have a volume of approximately (i.e., within 10%) 2670 cubic centimeters.

Figure 3A:
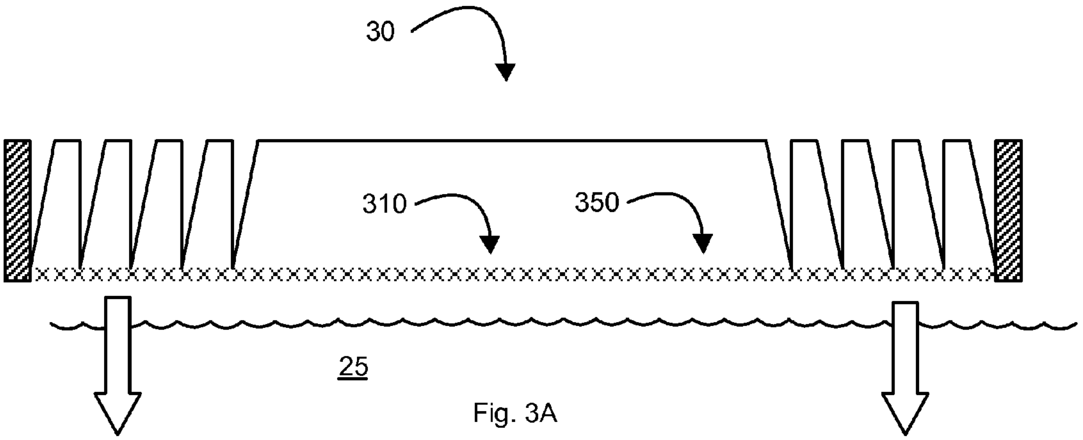
FIGS. 3A and 3B illustrate cross sections of a collapsible resonator according to an embodiment.
Figure 3B:
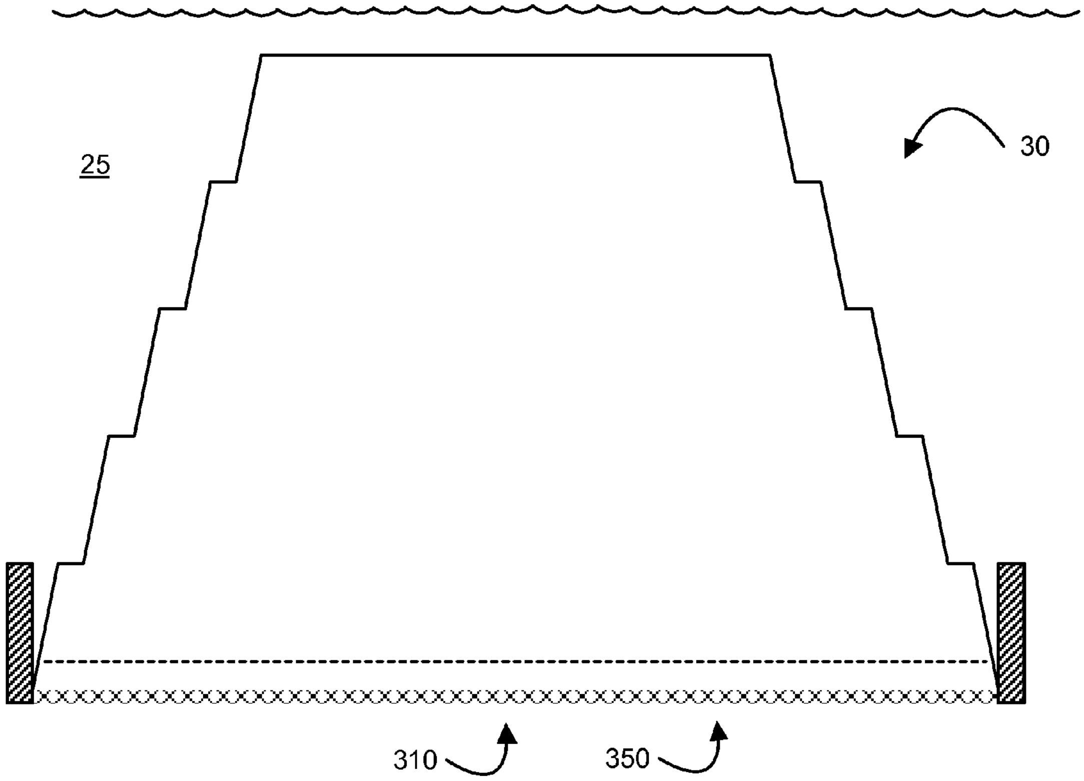

FIGS. 3A and 3B illustrate another exemplary embodiment of the resonator of the present invention similar to the one described above with respect to FIGS. 2A and 2B. However, a mesh 310 that is substantially permeable to fluid flow has been added to the open end 350 of the resonator 30. The mesh 310 can be constructed of a screen having thermally conductive properties as mentioned above.

Figure 4A:
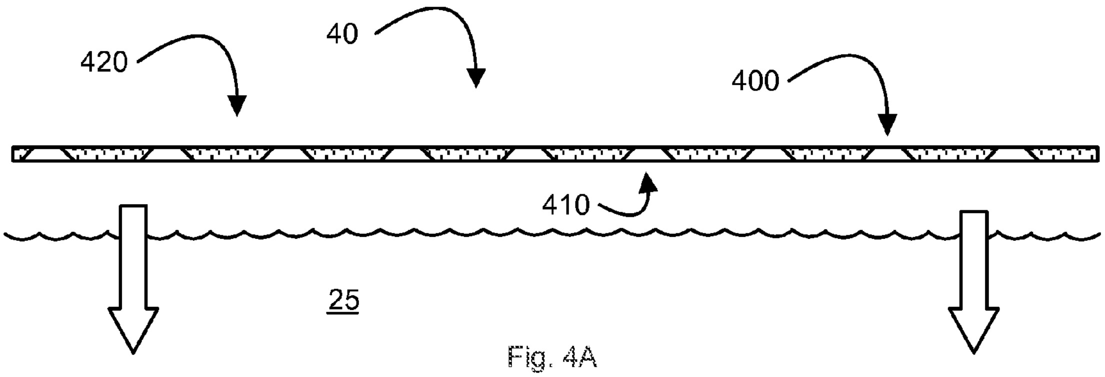
FIGS. 4A and B illustrate a noise abatement system
Figure 4B:
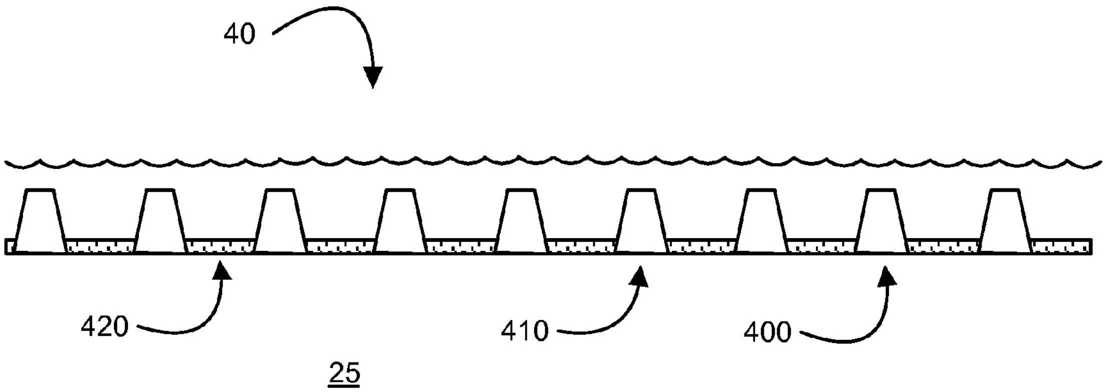

FIGS. 4A and B illustrate a noise abatement system 40 including a plurality of collapsible inverted cup-like resonator volumes 400, each having a downward-facing open end 410. Therefore, each of the resonators 400 can be designed as shown above with respect to FIGS. 2 and 3. When the system 40 is stored, transported or in the air above water (e.g., as illustrated in FIG. 4A) the resonators are in their collapsed state. Then, upon deployment in the water 25 (e.g., as illustrated in FIG. 4B) the plurality of resonators 400 expand to their operational size and shape as the resonators 400 fill with buoyant air. The plurality of resonators 400 can be formed on or in a panel 420 (e.g., as an array of resonators 400) in a way similar to a venetian blind, so as to simplify deployment. The resonators 400 can be formed of a rigid material or can have a rigid frame (e.g., aluminum) with a flexible material (e.g., neoprene) on the walls defined by the frame. Alternatively, the resonators 400 can be formed from a flexible material.

Figure 5A:
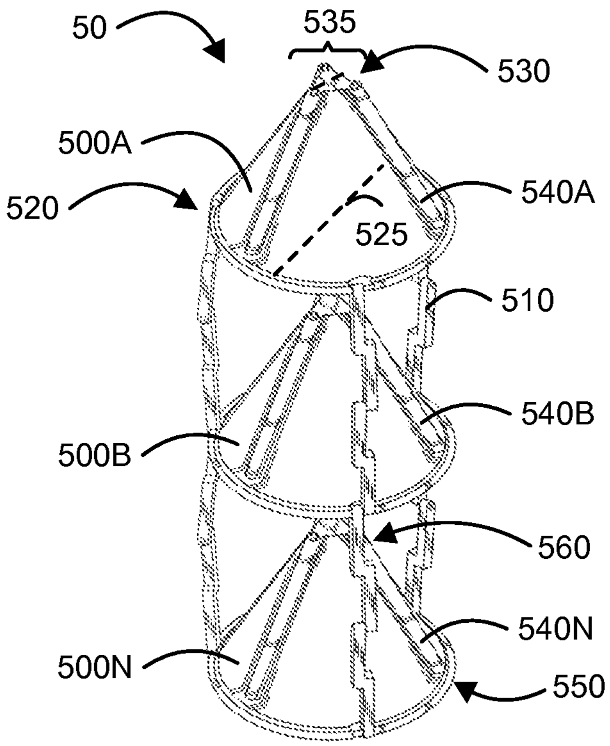
FIG. 5A illustrates an exemplary resonator system in a deployed configuration.
Figure 5B:
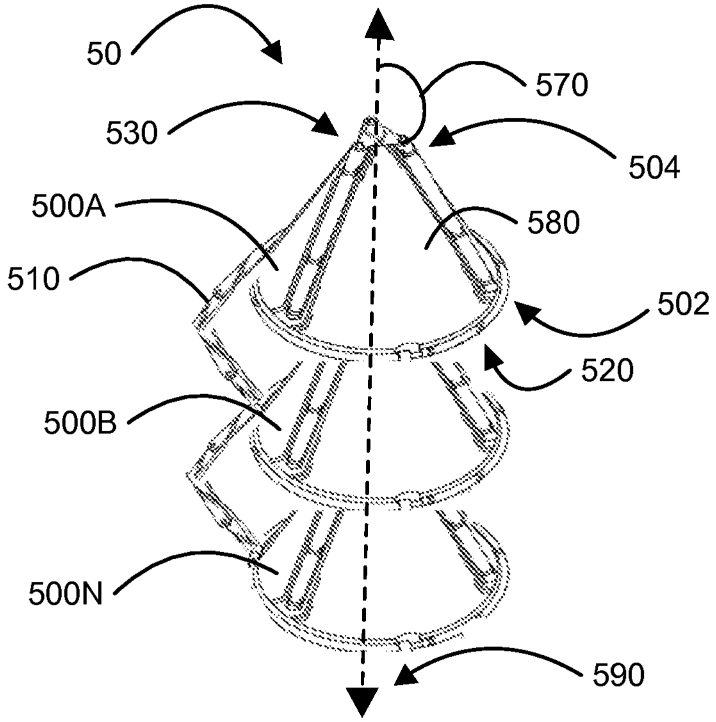
FIG. 5B illustrates an exemplary resonator system in a stacked configuration

FIG. 5A illustrates an exemplary resonator system 50 in a deployed configuration. The resonator system 50 has a plurality of stacked or stackable resonator bodies 500A, 500B, 500N (referred to in general as resonator body 500) in the form of a cone. It is noted that the resonator bodies 500A, 500B, 500N can be other shapes (e.g., pyramid, semi-spherical, etc.) and that the cone shape illustrated in FIGS. 5A and 5B is merely illustrative. At least one coupling 510 connects adjacent resonator bodies (e.g., 500A and 500B). The coupling 510 is articulated to flexibly connect one resonator body (e.g., 500A) to another (e.g., 500B). In some embodiments, the coupling 510 is flexible, telescoping, and/or segmented. Alternatively, the coupling 510 can be rigid.

The resonator body 500 has an open end 520 and a closed end 530. The resonator body 500 is hollow and is generally tapered from the open end 520 to the closed end 530. The open end 520 has a first width (e.g., a diameter) 525 and the closed end 530 has a second width (e.g., a diameter) 535. As the resonator body 500 is shaped like a cone, the first width 525 is greater than the second width 535. In some embodiments, however, the first width 525 is less than the second width 535. Thus, in general, the first width 525 is not equal to the second width 535. The resonator body 500 can be formed of a rigid material or can have a rigid frame (e.g., aluminum) with a flexible material (e.g., neoprene) on the walls defined by the frame. Alternatively, the resonator body 500 can be formed from a flexible material. The resonator 500 can have an internal volume of about (i.e., within 10%) 220 cubic centimeters.

FIG. 5B illustrates the resonator system 50 in a stacked or collapsed configuration. In this configuration, the open end 520 of a first resonator body 500A is stacked and/or nested on top of the closed end 530 of a second resonator body 500B while the coupling 510 is in a folded/bent configuration. The first resonator body 500A partially covers the second resonator body 500B. This configuration is advantageous for storage as the resonator system 50 is more compact along a central axis 590 than the resonator system 50 in the deployed configuration (FIG. 5A). The central axis 590 passes through the open end 520 and the closed end 530 of the resonator body 500 and forms an angle 570 (i.e., other than 180 degrees) with a tapered sidewall 580 of the resonator body 500.

The first resonator 500A and the second resonator 500B have respective resonance frequencies, as discussed above. In some embodiments, the first resonator 500A has a first resonance frequency that is different than a second resonance frequency of the second resonator 500B. Alternatively, the first resonator 500A and the second resonator 500B can have the same or substantially the same (i.e., within 10%) resonance frequency. The resonance frequencies can be between about 30 Hz and about 200 Hz including about 110 Hz.

In some embodiments, one or more conduits 540A, 540B, 540N (referred to in general as conduit 540) are defined on or in the stackable resonator bodies 500A, 500B, 500N, respectively. A lower open end 502 of the conduit 540 (e.g., a spill hole) is disposed at or near the open end 520 of the resonator body 500. An upper open end 504 of the conduit 540 is disposed at or near the closed end 530 of the resonator body 500 and below the adjacent resonator 500. In operation, gas (e.g., air) bubbles into the open end 520 of the hollow resonator body 500N. The gas can be supplied from a gas source (e.g., a pressurized gas tank). The gas bubbles rise to the closed end 530 of the hollow resonator body 500N and then fill the hollow resonator body 500N from the closed end 530 to the open end 520 thereof. When the hollow resonator body 500N is filled with gas, the gas is at or near the open end 520 of the hollow resonator body 500N. The gas then flows into the conduit 540N on the resonator body 500N from the lower open end 502 to the upper open end 504 of the conduit 540N. The gas then bubbles into the next resonator body 500B immediately above resonator body 500N. The same process can repeat until all resonator bodies 500 along a vertical axis are filled with gas.

Figure 6:
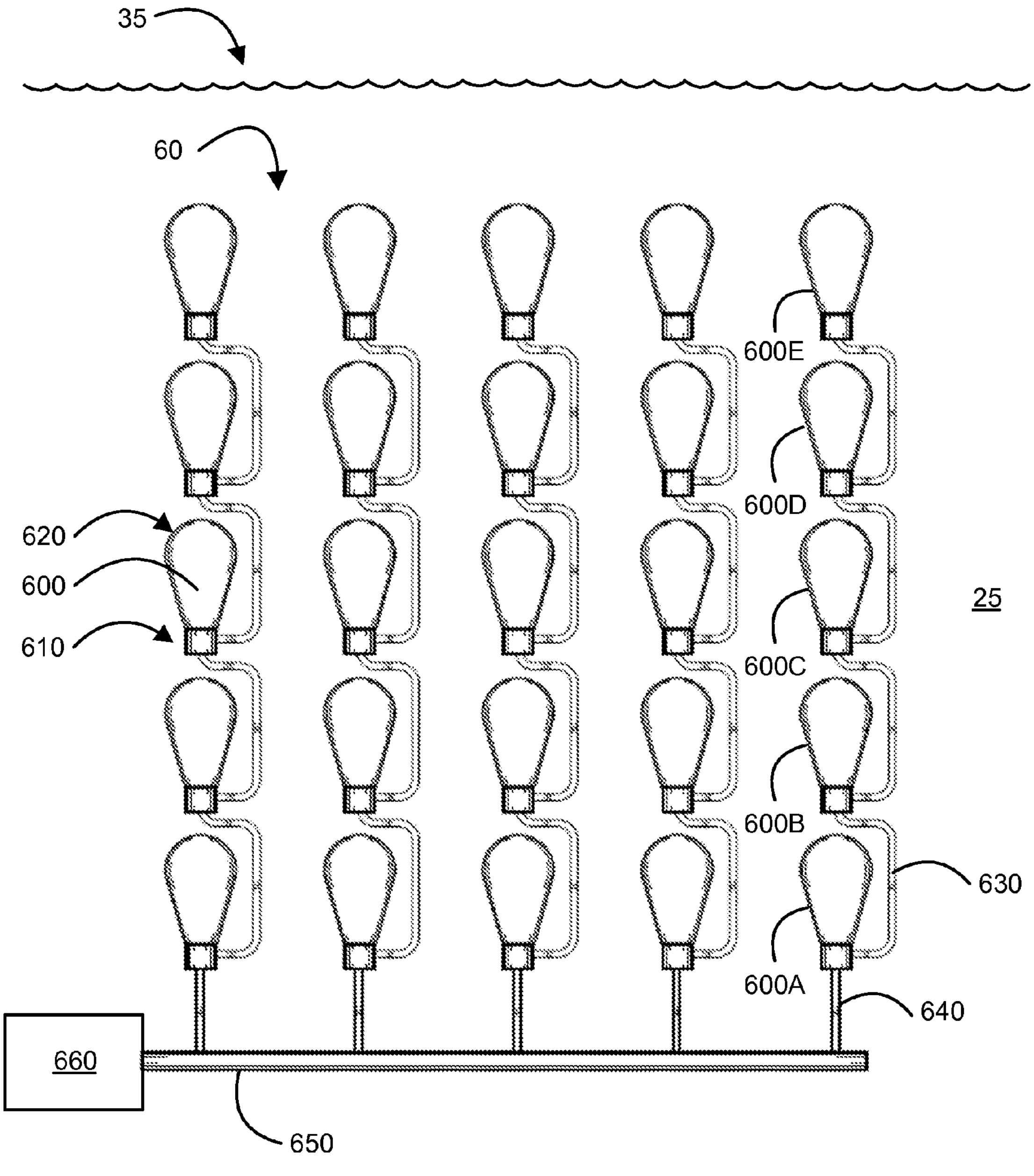
FIG. 6 illustrates a panel of resonators according to an embodiment.

FIG. 6 illustrates a panel 60 of resonators 600 in an embodiment. The resonators 600 are configured in an array of X resonators 600 horizontally and Y resonators vertically (e.g., in a column). In some embodiments, the array includes an additional dimension of Z resonators 600 along a direction orthogonal to the horizontal and vertical directions. Each resonator 600 has a first end 610 and a second end 620 and has a hollow body as discussed above. The resonator 600 is generally in the shape of an inverted bulb (e.g., a light bulb) but it can be in any shape appropriate to catch and contain gas. The first end 610 can be open or partially open to the surrounding water 25 environment. The resonators 600 can be formed of a rigid material or can have a rigid frame (e.g., aluminum) with a flexible material (e.g., neoprene) on the walls defined by the frame. Alternatively, the resonators 600 can be formed from a flexible material.

A conduit 630 connects adjacent resonators 600 (through respective first ends 610) along a vertical direction as illustrated in FIG. 6. Through the conduit 630, a first resonator 600A is in fluid communication with a second resonator 600B where the second resonator 600B is disposed below the first resonator 600A. A gas can be introduced into the first end 610 of the first resonator 600A through an inlet 640. The inlet is connected to a manifold 650, which in turn is connected to a gas source 660. Alternatively, the inlet 640 is directly connected to the gas source 660, which can be a source of compressed gas.

The first resonator 600A and the second resonator 600B have respective resonance frequencies, as discussed above. In some embodiments, the first resonator 600A has a first resonance frequency that is different than a second resonance frequency of the second resonator 600B. Alternatively, the first resonator 600A and the second resonator 600B can have the same or substantially the same (i.e., within 10%) resonance frequency. The resonators 600 across the array can be the same, substantially the same, or different than each other.

In operation, the gas (e.g., air) is pumped or otherwise introduced into the inlet 640 of the first resonator 600A through the manifold 650. The gas fills the hollow body of the first resonator 600A and displaces the fluid (e.g., water) in the hollow body. The fluid flows through the conduit 630 to the second resonator 600B. Alternatively, the fluid flows through a vent or valve in the first end 610 of the first resonator 600A. After the gas creates a threshold pressure in the first resonator 600A, the gas displaces the fluid in the conduit 630 and in the second resonator 600B thus filling the second resonator 600B with the gas. This process continues for the Y conduits 600 in the vertical direction (i.e., through resonators 600C, 600D, and 600E). In this orientation, the gas will naturally flow vertically towards a surface 35 of the water 25 due to the buoyancy of the gas. The fluid in the resonators 600A, 600B, etc. displaced by the gas can be expunged into the water 25 through a valve or similar means.

Figure 7A:
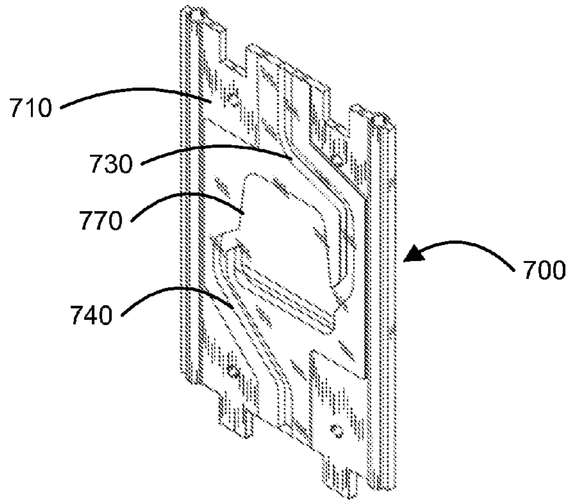
FIGS. 7A-7C illustrate mechanical details of a gas-filled resonator according to an embodiment.
Figure 7B:
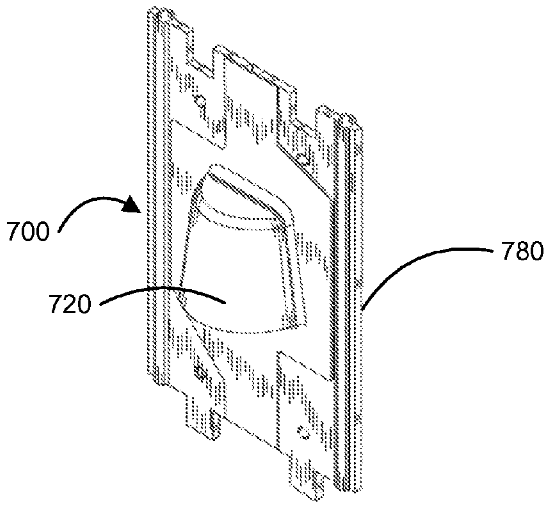
Figure 7C:
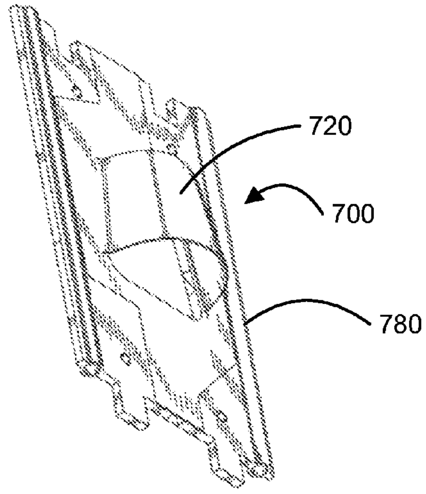

FIGS. 7A-7C illustrate mechanical details of a gas-filled resonator 700 in a panel 710 adapted for supporting a plurality of resonators to abate underwater noise, for example as described with respect to FIG. 6. FIG. 7A shows a cutaway cross-section of the hollow body 770 of the resonator 700. An inlet 740 and an outlet/conduit 730 are optionally connected to another such resonator (not shown). FIG. 7B illustrates a first perspective view of the resonator 700 in a support panel 780, while FIG. 7C illustrates yet another perspective view of the same.

In some embodiments, a wall 720 of the resonator 700 is soft and/or flexible while the panel 710 is rigid. The soft and/or flexible wall 720 permits the resonator 700 to be collapsible during storage. For example, the panel 710 (which can include an array of resonators 700) can be stored by stacking multiple panels 710 on top of each other or by rolling the panel 710 around a drum. In either case, the panel 710 can be stored more efficiently and/or compactly if the wall 720 of the resonator 700 is collapsible.

This invention is not limited to use in surface or sub-surface ships and vessels, but may be used by oil and gas companies drilling in the ocean (e.g., on rigs and barges), offshore power generation activities (e.g., pile driving activities from the installation of wind farms), as well as in bridge and pier construction or any other manmade noise-producing structures.

As far as applications of the current system, one can prepare panels similar to those described above for attachment to submerged structures or vessels. The panels can include a plurality of gas (e.g., air) cavities where the buoyancy of the air in the water environment causes the air to remain within the cavities. The cavities can be filled by the act of inverted submersion (i.e., the open side of the resonator is oriented down towards the ocean floor) of the panels or structure. Alternatively, the cavities can be actively filled using an air source disposed beneath the cavities so that the air from the source can rise up into and then remain in the cavities. The cavities may need to be replenished with gas from time to time.

In some embodiments, gas other than air may be used to fill the cavities. The temperature of the gas in the cavities may also affect their performance and resonance frequencies, and so this can also be modified in some embodiments.

Figure 8A:
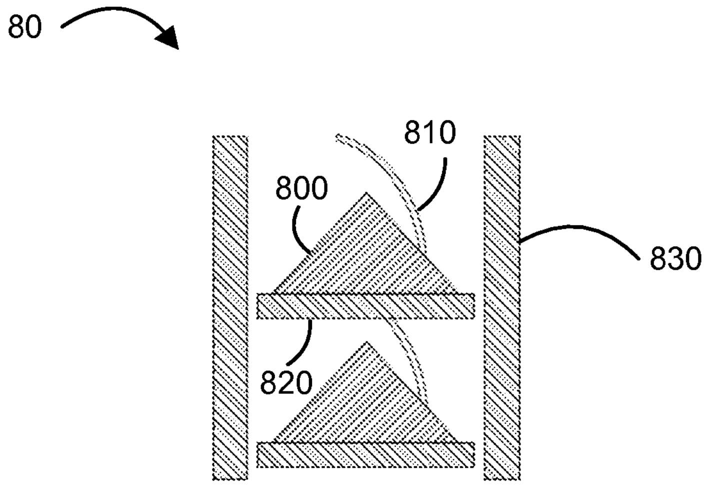
FIGS. 8A and 8B illustrate a noise abatement apparatus arranged in stackable strips according to an embodiment.
Figure 8B:
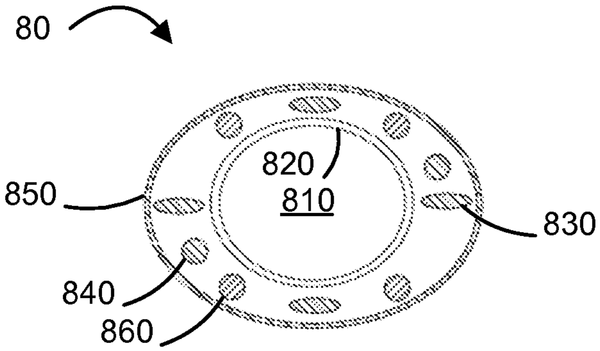

FIGS. 8A and 8B illustrate exemplary side view and top view sections, respectively, of a noise abatement apparatus 80 arranged in stackable strips that can be deployed from a sea-faring platform by a deployment system. The noise abatement apparatus 80 comprises conical resonators 800 that are coupled to one another in a stackable fashion by a gas line 810. Each resonator 800 has a flexible resonator and stainless steel expansion ring 820. The stack can also be equipped with air, power, communication and other fluid and electrical signaling lines 840. A smooth outer sheath 850 houses a stack of resonators. Stiffeners 830 (e.g., fire hose like tubes or inflatable structures) can provide mechanical rigidity to the system. Lift cables 860 can be included as shown to provide counter weighting if necessary.

Figure 9:
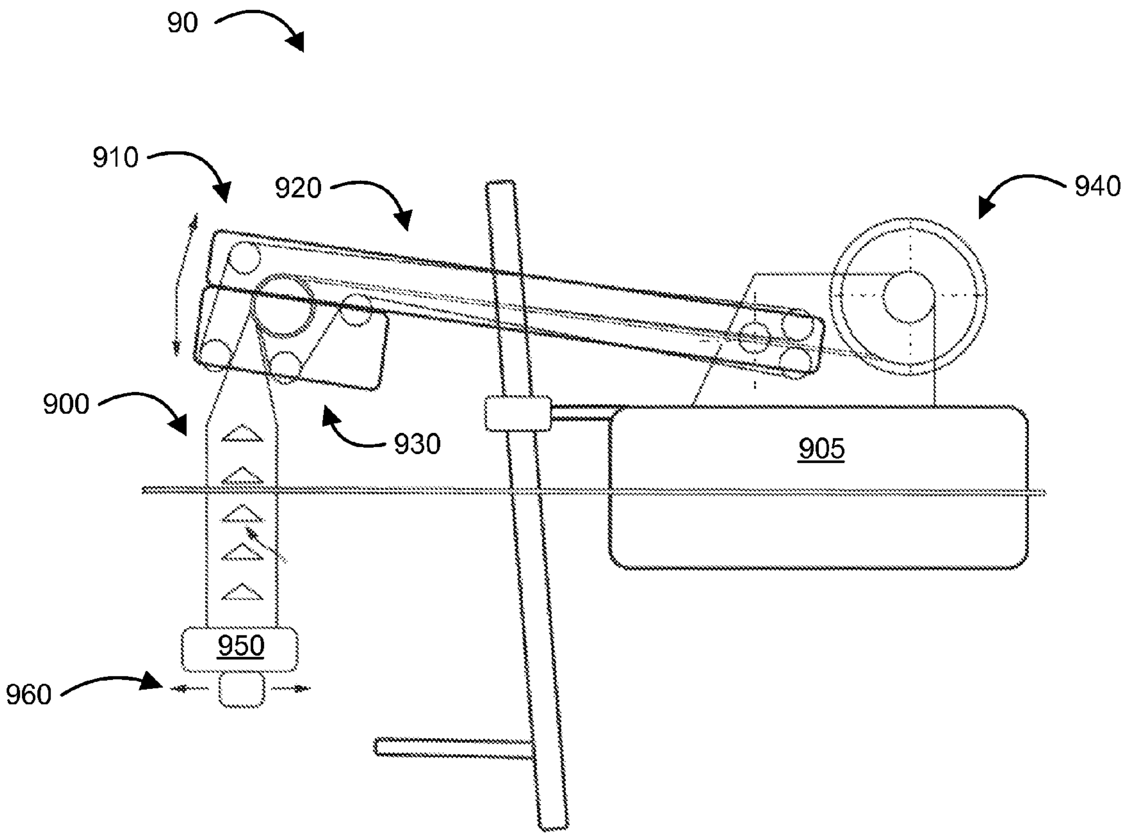
FIG. 9 illustrates an exemplary deployment system for a water noise abatement system.

FIG. 9 illustrates an exemplary deployment system 90 for the water noise abatement system 900. The system 90 can be deployed from a barge boom 910 supporting a resonator strip 920 on a guide of belts and rollers 930. The resonators are stored and deployed from a roll 940 that can be collapsed to about 8 ft×16 ft in an exemplary embodiment. A ballast 950 can be used if necessary to assist the lowering of the noise abatement resonator system 900 into the water. A steerable counter weight base, air supply, cameras, thrust units and other assemblies for moving and positioning the system (collectively referred to as 960) are included and coupled to a platform tower structure.

Many other designs can be developed for noise abatement and damping purposes. In other embodiments, the resonating cavity may be filled with a liquid fluid instead of a gas fluid. For example, if the system is to be operated at extreme depths in the ocean, a liquid other than water having a compressibility different than that of sea water could also be used, as would be appreciated by those skilled in the art.

Those skilled in the art will appreciate upon review of the present disclosure that the ideas presented herein can be generalized, or particularized to a given application at hand. As such, this disclosure is not intended to be limited to the exemplary embodiments described, which are given for the purpose of illustration. Many other similar and equivalent embodiments and extensions of these ideas are also comprehended hereby. The claims are intended to cover such modifications.

What is claimed is:

1. A stackable resonator system for damping acoustic energy from a source in a liquid, comprising:

a first resonator and a second resonator each having a hollow body comprising an open end, a closed end, and sidewalls, wherein said open end has a first width in cross section and said closed end has a second width in cross section, said first width different than said second width, said sidewalls integrally connecting said open end to said closed end; and a coupling connecting said first and second resonators;

wherein said open end of said first resonator is stackable on said closed end of said second resonator in a storage position.

2. The stackable resonator system of claim 1 wherein said sidewalls connect said open end to said closed end at an angle with respect to a central axis through said open end and said closed end.

3. The stackable resonator system of claim 1 wherein said coupling is articulated.

4. The stackable resonator system of claim 1 wherein said first resonator has a first resonance frequency and said second resonator has a second resonance frequency.

5. The stackable resonator system of claim 4 wherein said first resonance frequency is different than said second resonance frequency.

6. The stackable resonator system of claim 5 further comprising a conduit defined in said sidewalls of said first resonator, said conduit adapted to transport a gas from said open end to said closed end of said first resonator.

* * * * *